(12) United States Patent
Tetsuka et al.

(10) Patent No.: US 8,201,670 B2
(45) Date of Patent: Jun. 19, 2012

(54) BICYCLE HYDRAULIC BRAKE ACTUATION DEVICE

(75) Inventors: Toshio Tetsuka, Hyogo (JP); Kenji Nakahara, Osaka (JP)

(73) Assignee: Shimano Inc., Osaka (JP)

( * ) Notice: Subject to any disclaimer, the term of this patent is extended or adjusted under 35 U.S.C. 154(b) by 342 days.

(21) Appl. No.: 12/640,823

(22) Filed: Dec. 17, 2009

(65) Prior Publication Data

US 2011/0147149 A1    Jun. 23, 2011

(51) Int. Cl.
*B60T 11/16* (2006.01)

(52) U.S. Cl. .................................. 188/344; 188/24.22

(58) Field of Classification Search ............... 188/24.14, 188/24.22, 26, 344
See application file for complete search history.

(56) References Cited

U.S. PATENT DOCUMENTS

| | | | |
|---|---|---|---|
| 6,336,525 B1 | 1/2002 | Leng | |
| 6,457,378 B2 * | 10/2002 | Hatakoshi et al. | ............... 74/525 |
| 6,804,961 B2 | 10/2004 | Lumpkin | |
| 6,957,534 B2 | 10/2005 | Lumpkin | |
| 7,178,646 B2 | 2/2007 | Lumpkin | |
| 7,204,350 B2 | 4/2007 | Lumpkin | |
| 7,530,435 B2 | 5/2009 | Lumpkin | |
| 7,559,414 B2 | 7/2009 | Lumpkin | |
| 7,575,105 B2 | 8/2009 | Lumpkin | |
| 7,832,531 B2 * | 11/2010 | Hirose et al. | ................... 188/344 |
| 2006/0278031 A1 * | 12/2006 | Takizawa et al. | ............. 74/502.2 |
| 2007/0209360 A1 * | 9/2007 | Takizawa et al. | ............. 60/547.1 |
| 2008/0116025 A1 | 5/2008 | Lumpkin | |
| 2008/0245632 A1 * | 10/2008 | Watarai et al. | ................. 188/344 |
| 2008/0271446 A1 | 11/2008 | Lumpkin | |
| 2009/0000878 A1 | 1/2009 | Lumpkin | |

FOREIGN PATENT DOCUMENTS

| | | |
|---|---|---|
| EP | 1 325 863 B1 | 7/2003 |
| EP | 1 498 347 A2 | 1/2005 |
| EP | 1 595 781 A2 | 11/2005 |
| EP | 1 595 782 A2 | 11/2005 |

* cited by examiner

*Primary Examiner* — Christopher Schwartz
(74) *Attorney, Agent, or Firm* — Global IP Counselors, LLP

(57) ABSTRACT

A bicycle hydraulic brake actuation device includes a hydraulic master cylinder housing having a bore, a lever, a master piston and an adjuster. The lever is pivotally coupled to the hydraulic master cylinder housing for movement between an at rest position and a brake engagement position. The master piston is disposed within the bore and having an adjustment end. The adjuster is operably disposed between the adjustment end of the master piston and a portion of the lever. The adjuster is movable between a plurality of adjustment positions relative to the adjustment end such that with the lever in the at rest position, movement of the adjuster between the plurality of adjustment positions moves the master piston between a corresponding plurality of adjustment positions along an axial length of the bore.

20 Claims, 7 Drawing Sheets

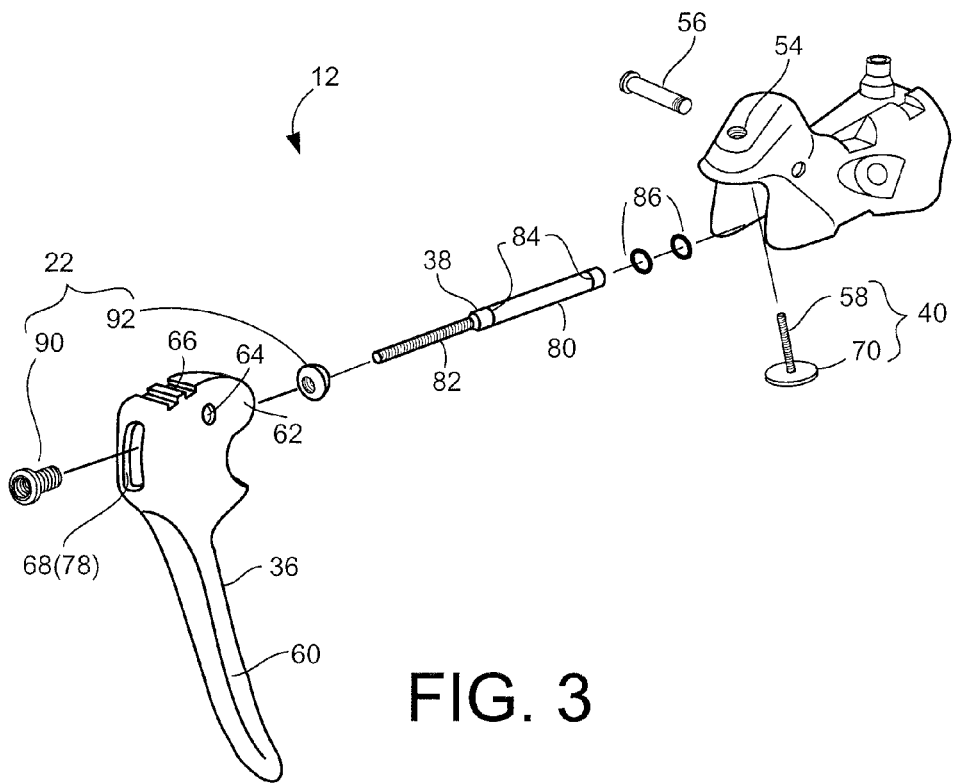
FIG. 3
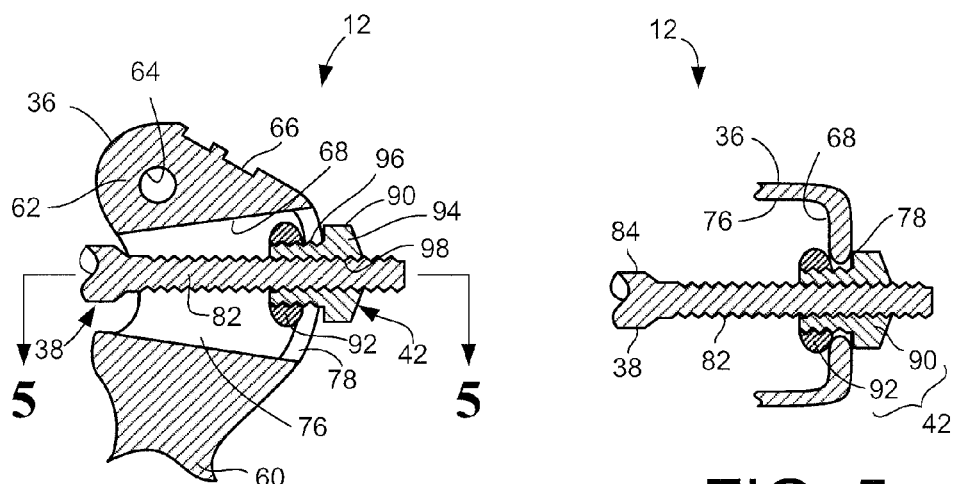
FIG. 4
FIG. 5

BICYCLE HYDRAULIC BRAKE ACTUATION DEVICE

BACKGROUND

1. Field of the Invention

This invention generally relates to a bicycle hydraulic brake actuation device. More specifically, the present invention relates to a bicycle hydraulic brake actuation device with a brake shoe positioning adjustment arrangement.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a bicycle hydraulic brake actuation device with a means for adjusting the position of brake shoes relative to a tire rim.

In accordance with one aspect of the present invention, a bicycle hydraulic brake actuation device includes a hydraulic master cylinder housing, a lever, a master piston and an adjuster. The hydraulic master cylinder housing has a bore. The lever is pivotally coupled to the hydraulic master cylinder housing for movement between an at rest position and a brake engagement position. The master piston is disposed within the bore and having an adjustment end. The adjuster is operably disposed between the adjustment end of the master piston and a portion of the lever. Further, the adjuster is movable between a plurality of adjustment positions relative to the adjustment end such that with the lever in the at rest position, movement of the adjuster between the plurality of adjustment positions moves the master piston between a corresponding plurality of adjustment positions along an axial length of the bore.

BRIEF DESCRIPTION OF THE DRAWINGS

Referring now to the attached drawings which form a part of this original disclosure:

FIG. 3 is an exploded view of the bicycle hydraulic brake actuation device showing the various elements including a housing, a lever, a master piston, a reach adjustment device and a piston position adjustment device of the bicycle hydraulic brake actuation device in accordance with the embodiment;

FIG. 4 is a cross-sectional view of a portion of the bicycle hydraulic brake actuation device showing the lever and the piston position adjustment device in accordance with the embodiment;

FIG. 5 is another cross-sectional view of a portion of the bicycle hydraulic brake actuation device taken along the line 5-5 in FIG. 4, showing the lever and the piston position adjustment device in accordance with the embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
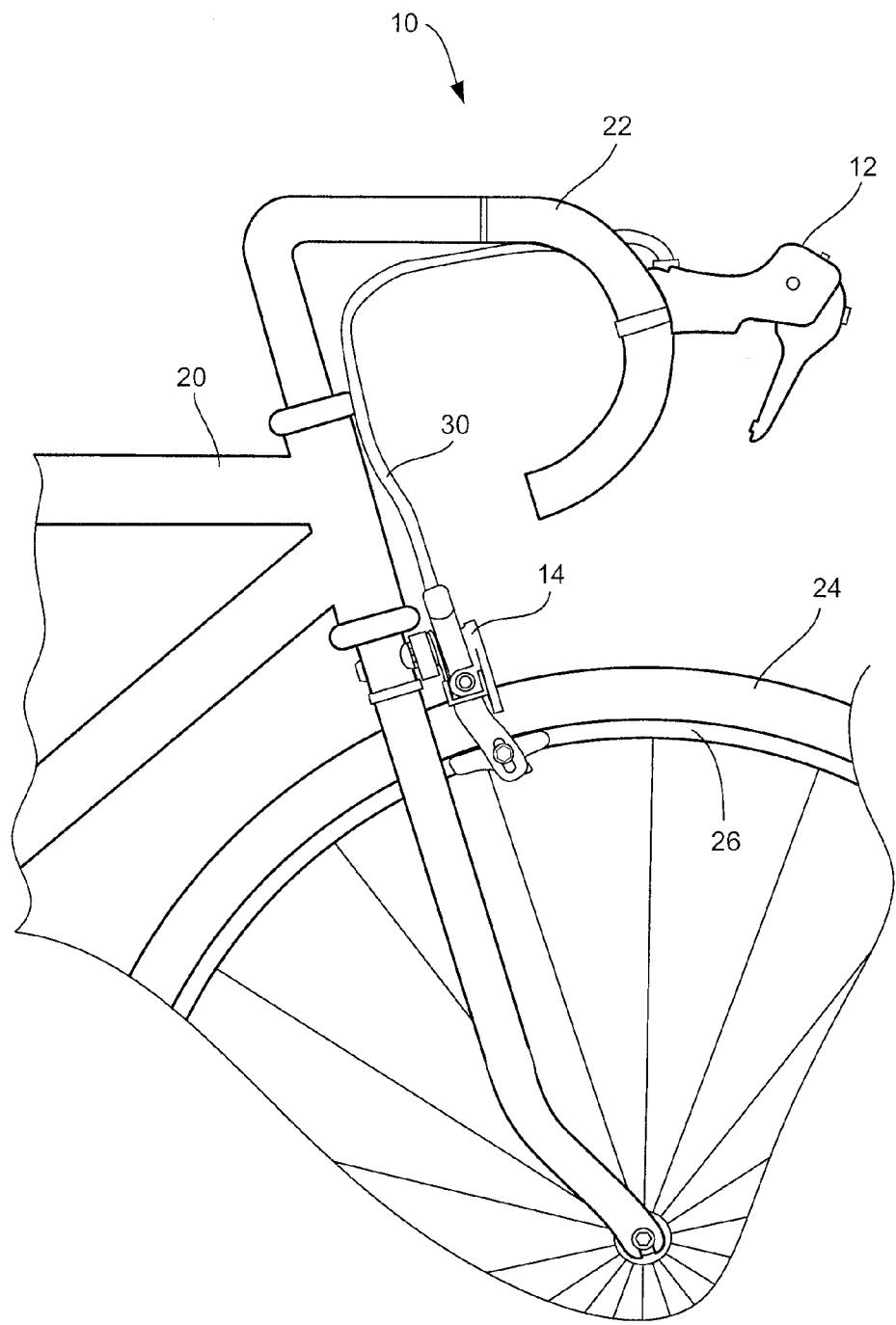
FIG. 1 is a side elevational view of a bicycle that is equipped with a bicycle hydraulic brake actuation device and a hydraulic brake calliper assembly in accordance with one embodiment.

Referring initially to FIG. 1, a bicycle 10 is illustrated with a hydraulic brake actuation device 12 and a hydraulic brake calliper assembly 14 in accordance with a first embodiment. The hydraulic actuation device 12 includes a brake shoe position adjustment arrangement, as described in greater detail below.

As shown in FIG. 1, the bicycle 10 includes a frame 20, handlebar 22 and a wheel 24 that includes a rim 26.

FIG. 1 only shows a portion of the frame 20 and only shows one wheel 24. It should be understood from the drawings and the description herein that the bicycle 10 includes a rear wheel (not shown), a rear hydraulic brake calliper assembly (not shown) and a rear hydraulic brake actuation device (not shown). The description below of the hydraulic brake actuation device 12 applies equally to both front and rear braking devices. Description of only one hydraulic brake actuation device 12 is provided for the sake of brevity.

Figure 2:
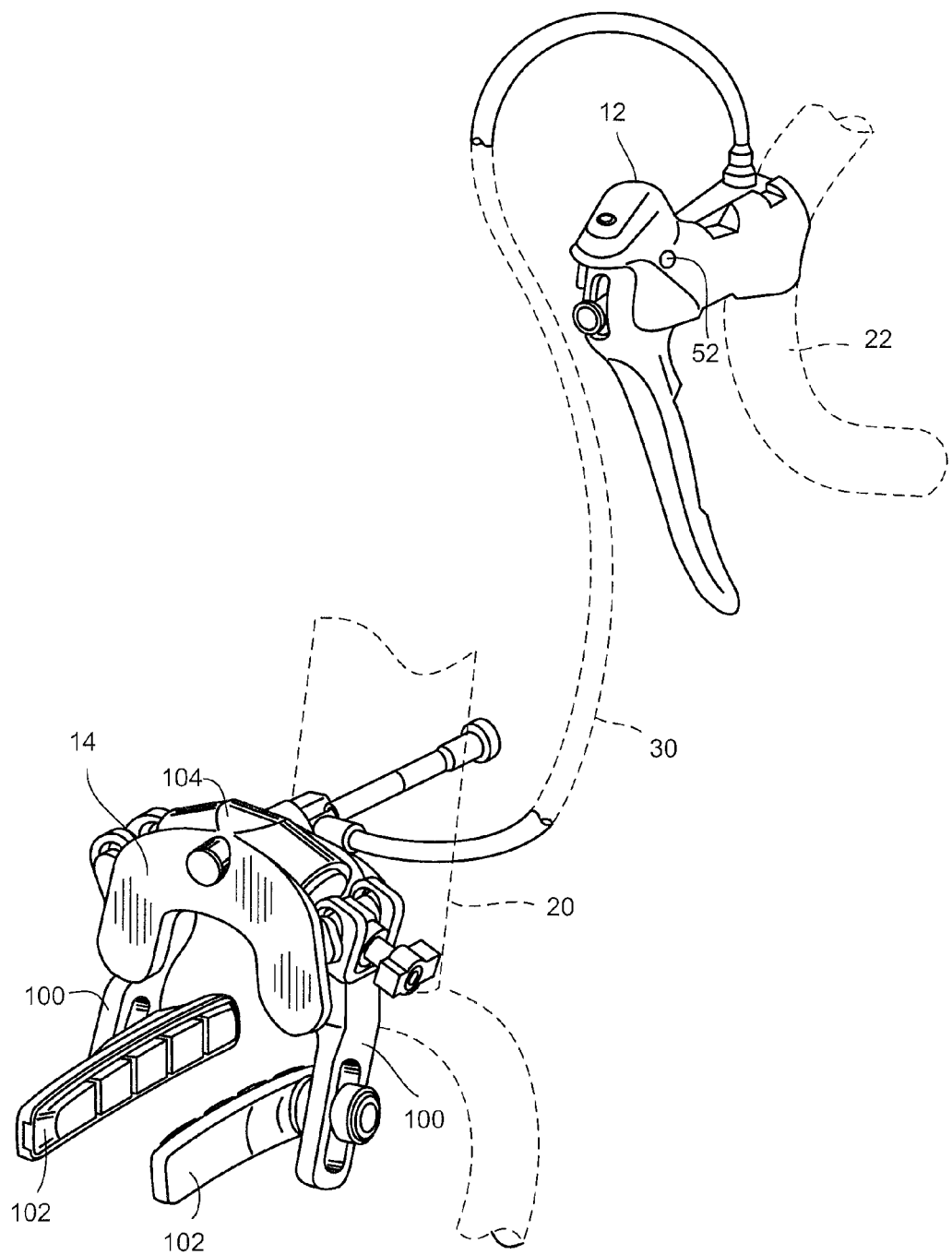
FIG. 2 is a perspective view of the bicycle hydraulic brake actuation device and the hydraulic brake calliper assembly with portions of the bicycle depicted in phantom in accordance with the embodiment.

As indicated in FIG. 2, the hydraulic brake actuation device 12 is connected via a hydraulic line 30 to the hydraulic brake calliper assembly 14. As is understood from the following description, the hydraulic brake actuation device 12 is configured to operate the hydraulic brake calliper assembly 14.

As shown in FIG. 3, the hydraulic brake actuation device 12 includes a housing 34, a lever 36, a master piston 38, a reach adjustment device 40 and a piston position adjustment device 42. The piston position adjustment device 42 is an adjuster that is part of the brake shoe position adjustment arrangement of the hydraulic brake actuation device 12.

The housing 34 is hydraulic master cylinder housing that includes a handlebar mounting device (not shown) and a bore 48, as shown in FIGS. 6-9. The bore 48 is dimensioned to receive the master piston 38 such that the master piston 38 is movable along an axial length of the bore 48 in a conventional manner, as described in greater detail below. In the depicted embodiment, the housing 34 is a reservoir free hydraulic actuator. In other words, no hydraulic fluid reservoir is included with the housing 34, the hydraulic brake actuation device 12 or the hydraulic brake calliper assembly 14. In the depicted embodiment, the hydraulic brake actuation device 12 and the hydraulic brake calliper assembly 14 are filled with hydraulic fluid during assembly. The amount of hydraulic fluid in the hydraulic brake actuation device 12 and the hydraulic brake calliper assembly 14 remains constant (absent a leak) when in use.

Alternatively, the hydraulic brake actuation device 12 can be provided with a hydraulic fluid reservoir. However, in the depicted embodiment, no reservoir is provided.

Figure 10:
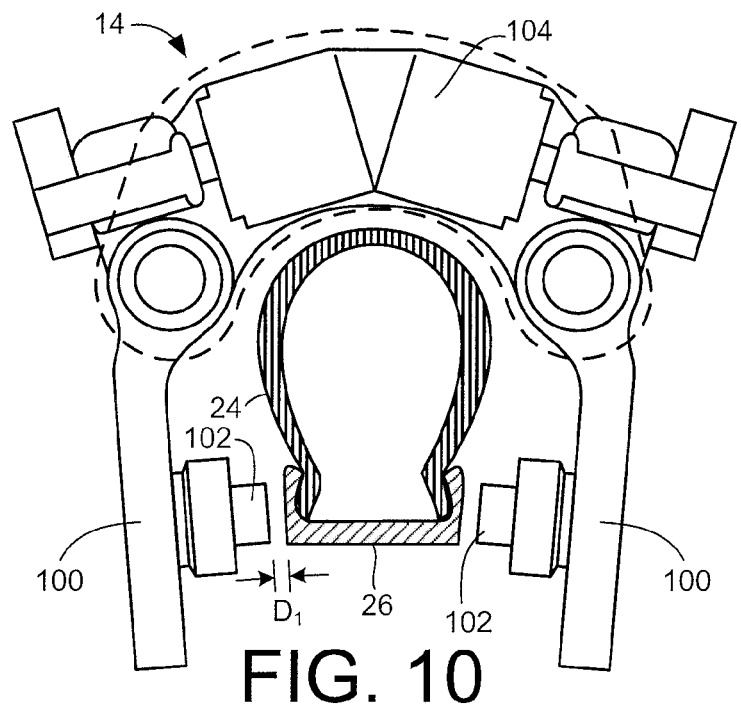
FIG. 10 is a front view of the hydraulic brake calliper assembly with brake shoes of the hydraulic brake calliper assembly shown in an at rest position corresponding to the at rest position of the bicycle hydraulic brake actuation device depicted in FIG. 6, in accordance with the embodiment.

As best shown in FIG. 6-9, the bore 48 includes a line opening 50 that is in fluid communication with the hydraulic line 30 in a conventional manner. The hydraulic line 30 transmits hydraulic fluid from within the bore 48 to the hydraulic brake calliper assembly 14 in a conventional manner to move the hydraulic brake calliper assembly 14 between an at rest position shown in FIG. 10 and an engagement position shown in FIG. 11. The bore 48 basically defines an axis such that the master piston 38 moves along the axis of the bore 48. Further the bore 48 and the master piston 38 extend in a first direction.

The housing 34 also includes a pair of pivot pin receiving apertures 52 (only one aperture 52 is shown in FIG. 2) and a reach adjuster aperture 54. The pivot pin receiving apertures 52 are dimensioned to receive a pivot pin 56. The reach adjuster aperture 54 is threaded to receive a threaded portion 58 of the reach adjustment device 42.

As best shown in FIGS. 3, 4 and 5, the lever 36 is an elongated member that includes a grip portion 60, a pivot portion 62 with a pivot pin aperture 64, a reach adjustment contacting surface 66 and an elongated opening 68.

The grip portion 60 (hand engagement portion) can have any of a variety of shapes that enable a rider to grip and operate the lever 36. Specifically, the lever 36 is moveable by the cyclist between an at rest position shown in FIG. 6 to a brake engagement position shown in FIG. 7. Further, the grip portion 60 of the lever 36 extends in a second direction. The first direction (of the bore 48 and the master piston 38) and second direction are offset from one another by an angle that is between 45 and 90 degrees with the lever 36 in the at rest position, as indicated in FIG. 6.

The pivot pin aperture 64 is dimensioned such that the pivot pin 56 extends therethrough. The lever 36 can freely pivot about the pivot pin 56 in a conventional manner.

Figure 6:
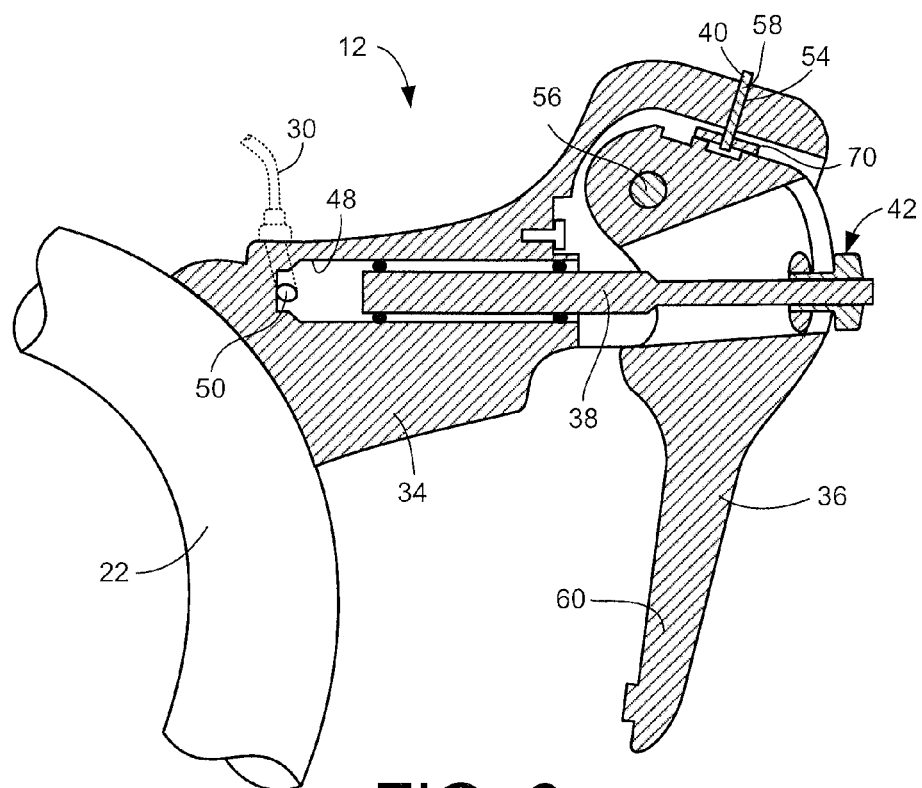
FIG. 6 is a cross-sectional view of the bicycle hydraulic brake actuation device showing the lever in an at rest position, the reach adjustment device in a first reach adjustment position and the piston position adjustment device in a first adjustment position in accordance with the embodiment.
Figure 8:
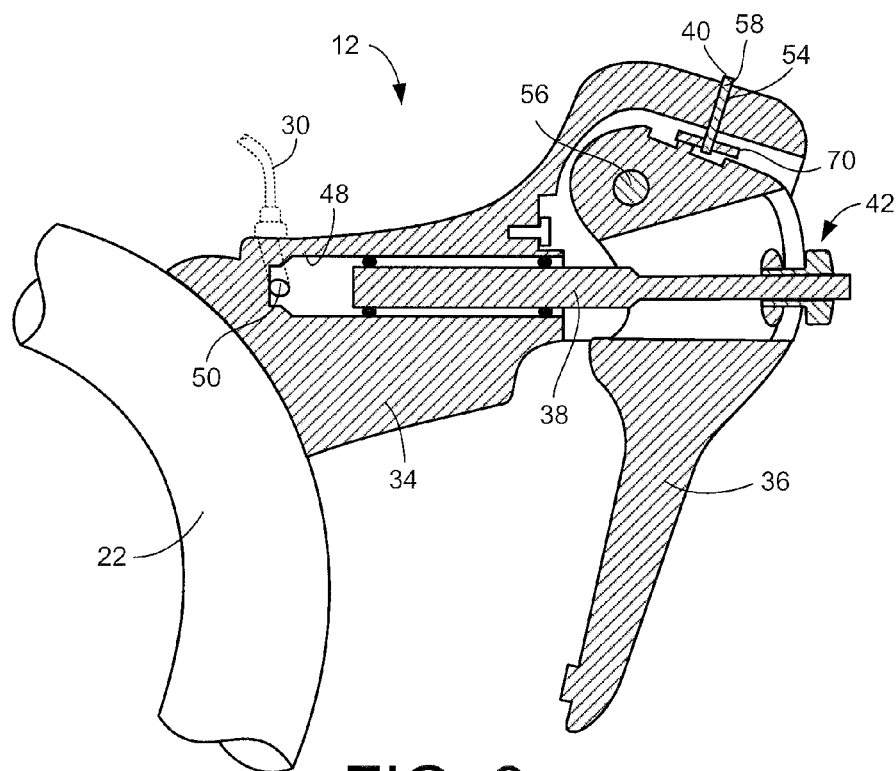
FIG. 8 is another cross-sectional view of the bicycle hydraulic brake actuation device similar to FIGS. 6 and 7, showing the lever in an at rest position, the reach adjustment device in a second reach adjustment position and the piston position adjustment device in the first adjustment position in accordance with the embodiment.
Figure 9:
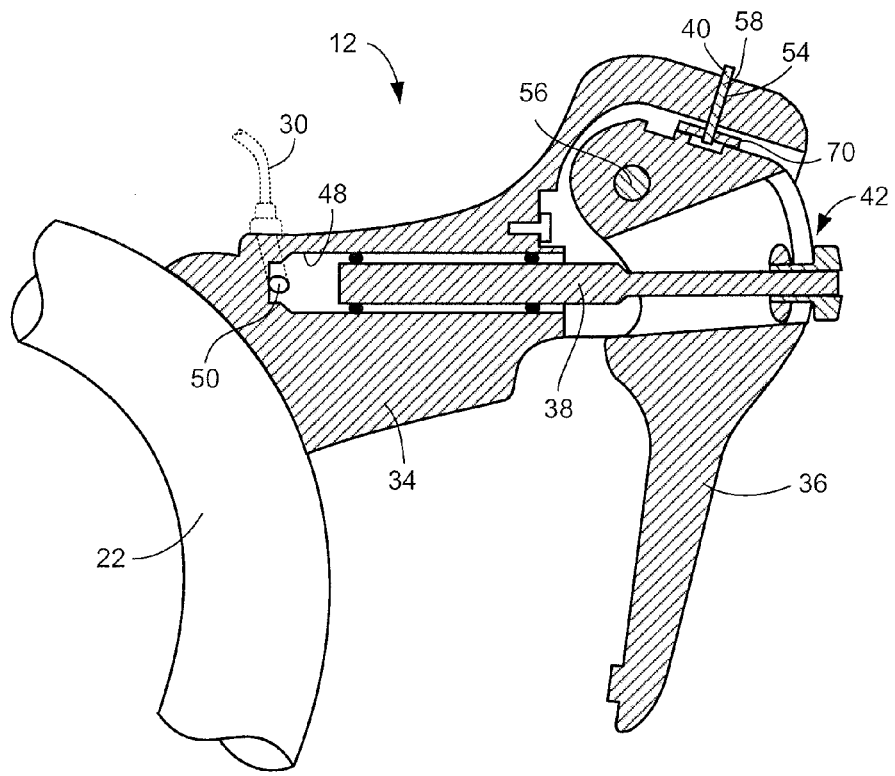
FIG. 9 is another cross-sectional view of the bicycle hydraulic brake actuation device similar to FIGS. 6, 7 and 8, showing the lever in an at rest position, the reach adjustment device in the first reach adjustment position and the piston position adjustment device in a second adjustment position in accordance with the embodiment.

The reach adjustment contacting surface 66 is shaped and positioned to contact a contacting portion 70 of the reach adjustment device 40, as indicated in FIGS. 6 and 8. Specifically, the threaded portion 58 of the reach adjustment device 40 is threadedly installed in the reach adjuster aperture 54 of the housing 34. The reach adjuster aperture 54 includes screw type threads that mate with corresponding threads on the threaded portion 58 of the reach adjustment device 40.

The reach adjustment device 40 is rotatable relative to the housing 34. Rotation of the reach adjustment device 40 using, for example, a tool (not shown) allows for selective positioning of the reach adjustment device 40. As shown in FIGS. 6 and 8, the reach adjustment device 40 is movable between a plurality of reach adjustment positions. In FIG. 6, the reach adjustment device 40 is in a first reach adjustment position and contacts the reach adjustment contacting surface 66 of the lever 36. Thus, as shown in FIG. 6, one at rest position is established by the contacting portion 70 of the reach adjustment device 40 contacting the lever 36.

As shown in FIG. 8, the reach adjuster 58 is in a second reach adjustment position and contacts the reach adjustment contacting surface 66 of the lever 36. Thus, as shown in FIG. 8, another at rest position is established by the positioning contacting portion 70 of the reach adjustment device 40 contacting the lever 36. The at rest position is adjustable to suit the needs of the rider. For example, a rider with big hands will likely prefer an at rest position such as that depicted in FIG. 6, where the lever 36 is further away from the handlebar 22 than in FIG. 8. Alternatively, a rider with small hands will likely prefer an at rest position such as that depicted in FIG. 8, where the lever 36 is closer to the handlebar 22 than in FIG. 6.

The elongated opening 68 extends through the lever 36, as indicated in FIGS. 4 and 6-9. The elongated opening 68 is narrower towards a front side of the lever (the right side of the drawings in FIGS. 4 and 6-9). Specifically, the elongated opening 68 has a wide section 76 and a narrow section 78. The narrow section 78 basically defines a slot best shown in FIG. 3 that is dimensioned such that one end of the master piston 38 can easily move up and down along the elongated opening 68, as described in greater detail below.

As best shown in FIG. 3, the master piston 38 has a first portion 80 and a second portion 82 (an adjustment end). The first portion 80 is dimensioned for insertion into the bore 48, as indicated in FIGS. 6-9. Specifically, the first portion 80 includes conventional seal retaining sections 84 that retain seals 86. When the master piston 38 is inserted into the bore 48, the seals 86 provide a hydraulic seal between the bore 48 and the master piston 38 such that hydraulic pressure can be generated in response to movement of the master piston 38. The second portion 82 of the master piston 38 is provided with machine threads, as is described in greater detail below.

As best shown in FIGS. 3, 4 and 5, the piston position adjustment device 42 includes a dial member 90 and a retaining member 92. The dial member 90 includes a dial portion 94 and a threaded portion 96. The threaded portion 96 of the dial member 90 and retaining member 92 are threadedly connected to one another. Specifically, the threaded portion 96 of the dial member 90 includes external threads that engage internal threads of the retaining member 92.

The retaining member 92 is preferably positioned within the wide section 76 of the elongated opening 68 of the lever 36. The dial portion 94 of the dial member 90 is preferably located outside the lever 36, adjacent to the narrow section 78 of the elongated opening 68. The threaded portion 96 of the dial member 90 extends through the narrow portion 78 of the elongated opening 68 and is threaded into the retaining portion 92.

As should be clear from the drawings, the threaded portion 96 of the dial member 90 is dimensioned to extend through the narrow section 78 of the elongated opening 68. However, both the dial portion 94 of the dial member 90 and the retaining member 92 are dimensioned such that they cannot fit into the narrow section 78 of the elongated opening 68. Thus, the dial member 90 and the retaining member 92 are positioned and dimensioned such that the piston adjustment device 42 can moved up and down along the slot opening defined by the narrow section 78 of the elongated opening 68. However, the piston adjustment device 42 cannot be removed from the narrow section 78 of the elongated opening 68 without separating the dial member 90 from the retaining member 92.

The dial member 90 is also provided with internal threads 98 that engage the machine threads on the second portion 82 of the master piston 38. The machine threads on the second portion 82 of the master piston 38 and the internal threads 98 of the dial member 90 are provided with tolerances that allow for smooth and easy rotation of the dial member 90 about second portion 82 of the master piston 38. In other words, a rider can easily rotate the dial member 90 relative to the master piston 38.

On the other hand, the threaded engagement between the threaded portion 96 of the dial member 90 and the retaining member 92 include tight tolerances such rotation of the dial member 90 relative to the retaining member 92 takes greater force that rotation of the dial member 90 relative to the master piston 38. Hence, when the dial member 90 is rotated by a cyclist, the piston adjustment device 42 rotates relative to the second portion 82 of the master piston 38. The dial member 90 does not become disengaged or unscrewed from the retaining member 92 when the dial member 90 is rotated.

The dial member 90 and the retaining member 92 are preferably coated with or made of low friction materials such that the dial member and the retaining member 92 can slide along the narrow section 78 of the elongated opening 68 with minimal wear over time.

It should be understood that the piston positioning adjustment device 42 (part of the brake shoe position adjustment arrangement) can be configured in any of a variety of arrangements. For example, the retaining member 92 can alternatively be provided with a threaded portion that extends through the narrow section 78 of the lever 36 and then threadedly connects to a dial member with internal threads.

As best shown in FIGS. 2 and 10-13, the hydraulic brake calliper assembly 14 includes a pair of brake arms 100, each having a brake shoe 102 operated by a conventional hydraulic section 104. As shown in FIG. 2, the hydraulic section 104 is connected via the hydraulic line 30 to the hydraulic brake actuation device 12. Fluid pressure generated by movement of the lever 36 and master piston 38 is transmitted via the hydraulic line 30 to the hydraulic section 104 of the hydraulic brake calliper assembly 14. The hydraulic section 104 includes slave pistons (not shown) that take the fluid pressure from the hydraulic line 30 and convert it into movement in a conventional manner, thus moving the brake arms 100 in response to movement of the lever 36 and master piston 38.

Figure 11:
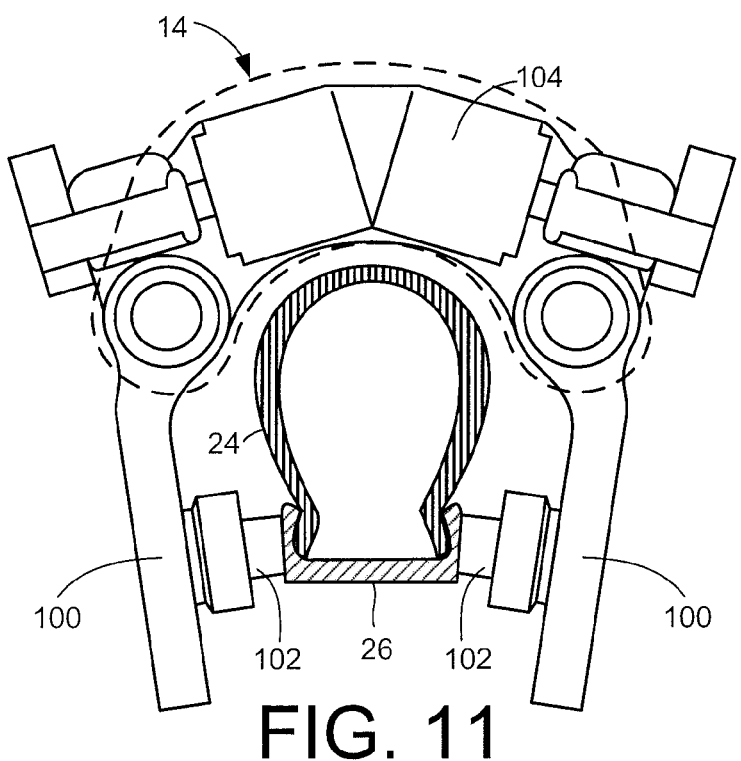
FIG. 11 is another front view of the hydraulic brake calliper assembly similar to FIG. 10, showing the brake shoes of the hydraulic brake calliper assembly engaged with the rim of the wheel corresponding to the brake engagement position of the bicycle hydraulic brake actuation device depicted in FIG. 7, in accordance with the embodiment.

For example, FIG. 6 shows the brake arms 100 in an at rest position, corresponding to the at rest position of the hydraulic brake actuation device 12 depicted in FIG. 6. In FIG. 6, the brake shoes 102 are positioned a distance $D_1$ away from the rim 26 of the wheel 24. When the hydraulic brake actuation device 12 is moved to the brake engagement position shown in FIG. 7, the brake arms 100 and brake shoes 102 of the hydraulic brake calliper assembly 14 move to the brake engagement position depicted in FIG. 11. In FIG. 11, the brake shoes 102 engage the rim 26 of the wheel 24.

Figure 12:
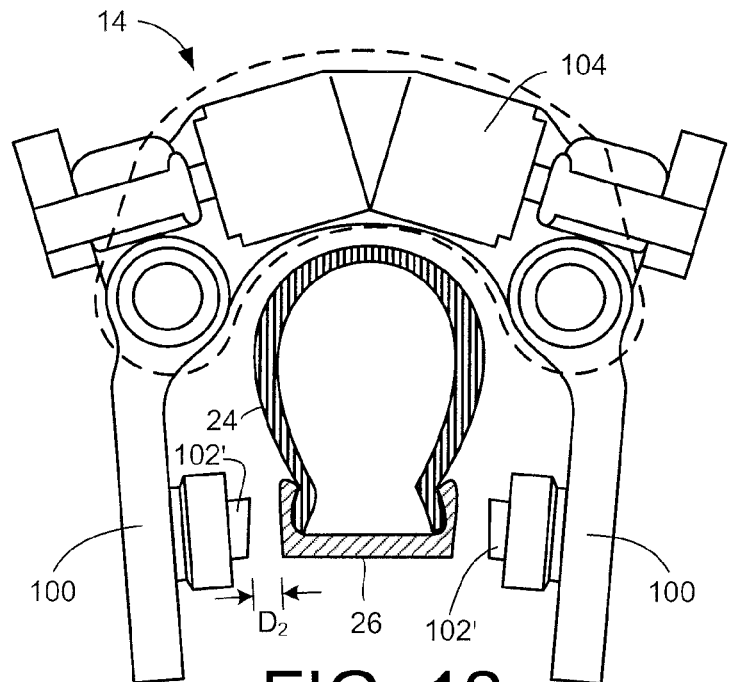
FIG. 12 is another front view of the hydraulic brake calliper assembly similar to FIGS. 10 and 11, showing the brake shoes of the hydraulic brake calliper assembly worn from usage and therefore spaced apart from the rim of the wheel in accordance with the embodiment.

Over time due to usage, the brake shoes 102 become worn and loose thickness. When the brake shoes 100 become worn and the brake arms 100 returning to the same at rest position, the brake shoes 102 are a greater distance away from the rim 26 of the wheel 24. As indicated in FIG. 12, worn brake shoes 102' are spaced apart from the rim 26 of the wheel 24 by a distance $D_2$. The distance $D_2$ is greater than the distance $D_1$ depicted in FIG. 10. In other words, worn brake shoes 102' are further away from the rim 26 that less worn brake shoes 102 with the brake arms 100 returning to the same at rest position. When the brake shoes 102 become worn, the lever 36 and the master piston 38 must move a greater distance in order to move the brake shoes 102 (or worn brake shoes 102') to engage the rim 26 in the brake engagement position shown in FIG. 11.

A description of the operation of the brake shoe position adjustment arrangement of the present invention is now provided with specific reference to FIGS. 6-13.

Figure 7:
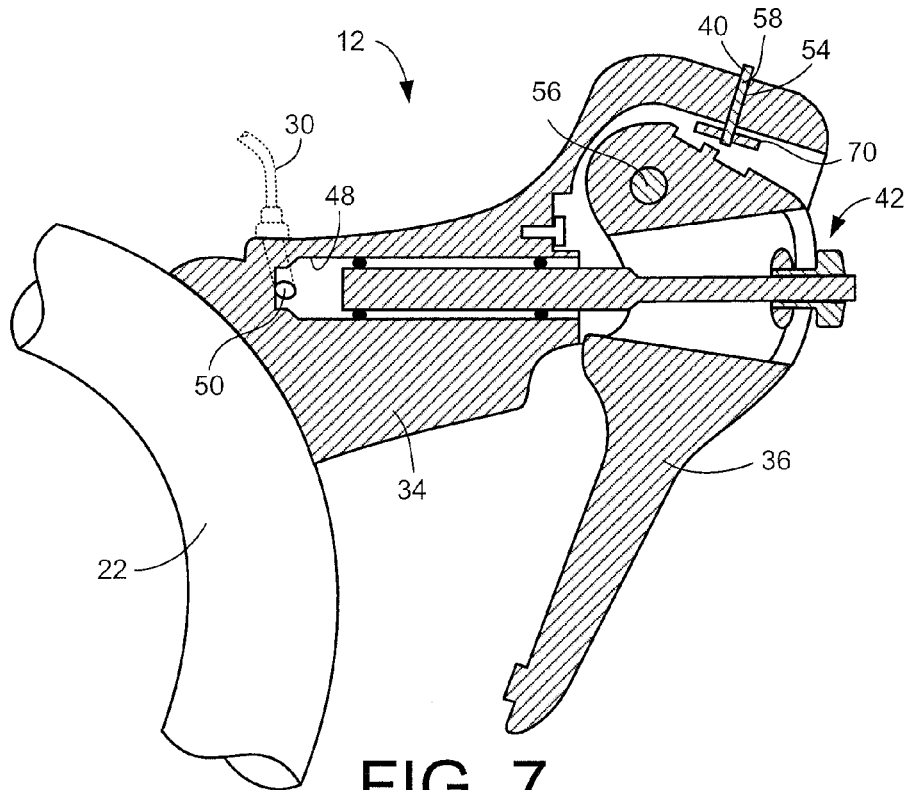
FIG. 7 is another cross-sectional view of the bicycle hydraulic brake actuation device similar to FIG. 6, showing the lever in an brake engagement position in accordance with the embodiment.

The lever 36 is pivotally coupled to the hydraulic master cylinder housing 34 for movement about the pivot pin 56 between the at rest position shown in FIG. 6 and the brake engagement position shown in FIG. 7. The piston position adjustment device 42 (the adjuster) is operably disposed between the second portion 82 (the adjustment end) of the master piston 38 and the narrow section 78 of the lever 36. The piston position adjustment device 42 is movable between a plurality of adjustment positions relative to the second portion 82 (the adjustment end) of the master piston 38 such that with the lever 36 in the at rest position, movement of the piston position adjustment device 42 between the plurality of adjustment positions moves the master piston 38 between a corresponding plurality of adjustment positions along an axial length of the bore 48.

For example, in FIG. 6, the piston position adjustment device 42 is shown in a first adjustment position with the master piston 38 in a corresponding first adjustment position. In FIG. 8, the piston position adjustment device 42 is shown in a second adjustment position with the master piston 38 in a corresponding second adjustment position. The re-positioning of the master piston 38 via adjustment of the position of piston position adjustment device 42 directly changes the position of the brake arms 100 and the brake shoes 102 of the hydraulic brake calliper assembly 14, as described below.

Figure 13:
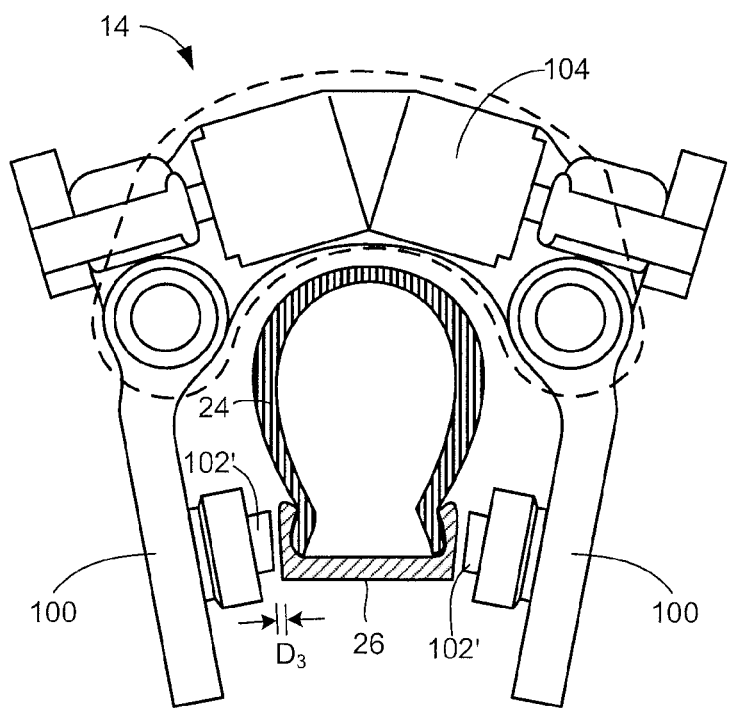
FIG. 13 is another front view of the hydraulic brake calliper assembly similar to FIGS. 10, 11 and 12, showing the worn brake shoes of the hydraulic brake calliper assembly moved closer to the rim of the wheel in response to adjustment of the piston adjustment device of the bicycle hydraulic brake actuation device to the second adjustment position shown in FIG. 9 in accordance with the embodiment.

Thus, when the brake shoes 102 become worn, like the worn brake shoes 102' depicted in FIG. 12, the cyclist can turn the dial member 90 of the piston position adjustment device 42. Note that in FIG. 12, the worn brake shoes 102' are spaced apart from the rim 26 by the distance $D_2$. Turning the dial member 90 changes the relative position between the lever 36 and the master piston 38. Specifically, with the lever 36 in the at rest position depicted in FIG. 6, the dial member 90 is turned until the master piston 38 is in the position depicted in FIG. 9. The re-positioning of the master piston 38 to the position shown in FIG. 9 causes a corresponding re-positioning of the at rest position of the brake arms 100 and the worn brake shoes 102' as indicated shown in FIG. 13. In FIG. 13, the worn brake shoes 102' are now spaced apart from the rim 26 by a distance $D_3$. The distance $D_3$ is less than the distance $D_2$. Therefore, the lever 36 no longer needs to move as far to move the worn brake shoes 102' into contact with the rim 26.

In a conventional brake assembly, adjustment of the at rest position of brakes shoes is performed at the calliper assembly. Hence, with the above described hydraulic brake actuation device 12 the cyclist can adjust the at rest position of brakes shoes 102 (and worn brake shoes 102') in a convenient manner.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the hydraulic brake actuation device. Accordingly, these terms, as utilized to describe the hydraulic brake actuation device should be interpreted relative to a bicycle equipped with the hydraulic brake actuation device as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic brake actuation device comprising:
   a hydraulic master cylinder housing having a bore;
   a lever pivotally coupled to the hydraulic master cylinder housing for movement between an at rest position and a brake engagement position;
   a master piston disposed within the bore and having an adjustment end; and
   an adjuster directly connected to the adjustment end of the master piston and directly connected to a portion of the lever, the adjuster being movable between a plurality of adjustment positions relative to the adjustment end such that with the lever in the at rest position, movement of the adjuster between the plurality of adjustment positions moves the master piston between a corresponding plurality of adjustment positions along an axial length of the bore.

2. The bicycle hydraulic brake actuation device according to claim 1, wherein
   the adjustment end of the master piston includes screw-type threads engaged with corresponding screw-type threads of the adjuster.

3. The bicycle hydraulic brake actuation device according to claim 2, wherein
   the lever includes a section defining a slot with the adjustment end of the master piston extending at least part way through the slot, and
   the adjuster includes a dial member and a retaining member, the dial member having the corresponding screw-type threads of the adjuster engaged with the corresponding screw-type threads of the adjustment end of the master piston, the dial member being disposed on a first side of the section of the lever, and the retaining member being attached to the dial member on a second side of the section of the lever such that the section of the lever is confined between the dial member and the retaining member.

4. The bicycle hydraulic brake actuation device according to claim 3, wherein
   the dial member and the retaining member are positioned and dimensioned such that the adjuster can moved up and down along the slot as the lever moves between the at rest position and the brake engagement position.

5. The bicycle hydraulic brake actuation device according to claim 2, wherein
   the adjuster is a dial member disposed at an outer section the lever.

6. The bicycle hydraulic brake actuation device according to claim 1, wherein
   the hydraulic master cylinder housing includes a lever reach adjustment mechanism operably arranged between the hydraulic master cylinder housing and the lever to adjust the at rest position of the lever.

7. The bicycle hydraulic brake actuation device according to claim 6, wherein
   the lever reach adjustment mechanism includes:
      an adjustment body rotatable about an axis that extends through a section of the hydraulic master cylinder housing, the adjustment body being in contact with a portion of the lever with the lever in the at rest position, and
      an adjustment screw coupled to the adjustment body to move the adjustment body to a plurality of adjustment positions.

8. The bicycle hydraulic brake actuation device according to claim 1, wherein
   the hydraulic master cylinder housing has no fluid reservoir other than the bore.

9. The bicycle hydraulic brake actuation device according to claim 1, wherein
   the adjuster is operably coupled to move with the lever between the at rest position and the brake engagement position such that the master piston moves with the adjuster.

10. The bicycle hydraulic brake actuation device according to claim 1, wherein
    the lever has a pivoting end and the adjuster is disposed adjacent to an exposed end of the pivoting end of the lever.

11. The bicycle hydraulic brake actuation device according to claim 1, wherein
    the master piston and the bore extend in a first direction,
    the lever includes a hand engagement portion that extends in a second direction, the first and second directions being offset from one another by an angle that is between 45 and 90 degrees with the lever in the at rest position.

12. The bicycle hydraulic brake actuation device according to claim 1, wherein
the lever includes a section defining a slot with the adjustment end of the master piston extending at least part way through the slot, and
the adjuster includes a dial member and a retaining member, the dial member being connected to the adjustment end of the master piston, the dial member being disposed on a first side of the section of the lever, and the retaining member being attached to the dial member on a second side of the section of the lever such that the section of the lever is confined between the dial member and the retaining member.

13. A bicycle hydraulic brake actuation device comprising:
a hydraulic master cylinder housing defining a bore and a lever reach adjustment mechanism;
a lever pivotally coupled to the hydraulic master cylinder housing for movement between an at rest position and a brake engagement position;
a master piston disposed within the bore and having an adjustment end; and
an adjuster coupling the adjustment end of the master piston and to a portion of the lever, the adjuster being movable between a plurality of adjustment positions relative to the adjustment end such that with the lever in the at rest position, movement of the adjuster between the plurality of adjustment positions moves the master piston between a corresponding plurality of adjustment positions along an axial length of the bore,
the lever reach adjustment mechanism being operably arranged between the hydraulic master cylinder housing and the lever to adjust the at rest position of the lever, the lever reach adjustment mechanism including:
an adjustment body rotatable about an axis that extends through a section of the hydraulic master cylinder housing, the adjustment body being in contact with a portion of the lever with the lever in the at rest position, and
an adjustment screw coupled to the adjustment body to move the adjustment body to a plurality of adjustment positions.

14. The bicycle hydraulic brake actuation device according to claim 13, wherein
the adjustment end of the master piston includes screw-type threads engaged with corresponding screw-type threads of the adjuster.

15. The bicycle hydraulic brake actuation device according to claim 14, wherein
the lever includes a section defining a slot with the adjustment end of the master piston extending at least part way through the slot, and
the adjuster includes a dial member and a retaining member, the dial member having the corresponding screw-type threads of the adjuster engaged with the corresponding screw-type threads of the adjustment end of the master piston, the dial member being disposed on a first side of the section of the lever, and the retaining member being attached to the dial member on a second side of the section of the lever such that the section of the lever is confined between the dial member and the retaining member.

16. The bicycle hydraulic brake actuation device according to claim 15, wherein
the dial member and the retaining member are positioned and dimensioned such that the adjuster can moved up and down along the slot as the lever moves between the at rest position and the brake engagement position.

17. The bicycle hydraulic brake actuation device according to claim 14, wherein
the adjuster is a dial member disposed at an outer section the lever.

18. The bicycle hydraulic brake actuation device according to claim 13, wherein
the hydraulic master cylinder housing has no fluid reservoir other than the bore.

19. The bicycle hydraulic brake actuation device according to claim 13, wherein
the master piston and the bore extend in a first direction,
the lever includes a hand engagement portion that extends in a second direction, the first and second directions being offset from one another by an angle that is between 45 and 90 degrees with the lever in the at rest position.

20. The bicycle hydraulic brake actuation device according to claim 13, wherein
the adjuster is operably coupled to move with the lever between the at rest position and the brake engagement position such that the master piston moves with the adjuster.

* * * * *